United States Patent [19]
Sit

[11] Patent Number: 5,940,835
[45] Date of Patent: Aug. 17, 1999

[54] METHODS AND APPARATUS FOR A UNIVERSAL TRACKING SYSTEM

[75] Inventor: Ho Wing Sit, Moraga, Calif.

[73] Assignee: OpenData Systems, Emeryville, Calif.

[21] Appl. No.: 08/964,035

[22] Filed: Nov. 4, 1997

[51] Int. Cl.$^6$ .................................................. G06F 17/30
[52] U.S. Cl. ............................................................ 707/102
[58] Field of Search ................................... 707/100, 102, 707/103, 104

[56] References Cited

U.S. PATENT DOCUMENTS

| | | | |
|---|---|---|---|
| 5,454,101 | 9/1995 | Mackay et al. | 707/3 |
| 5,467,471 | 11/1995 | Bader | 707/1 |
| 5,615,367 | 3/1997 | Bennett et al. | 707/102 |

Primary Examiner—Jack M. Choules
Attorney, Agent, or Firm—Fliesler, Dubb, Meyer & Lovejoy, LLP

[57] ABSTRACT

A universal tracking system is extremely versatile to permit tracking records in a database for any type of tracking application. A tracking identifier for a database record includes a plurality of fields of equal length. A tracking value, generated for the tracking identifier, tracks relationships among records, such that tracking values are generated to associate one or more fields of a tracking identifier of a first record with one or more fields of a tracking identifier of another record being tracked to the first record. The fields of the tracking identifier are assigned field identifiers to ascribe meanings to the fields to implement tracking systems that track related objects, including objects related in time. Also, field identifiers from one record may be extended to field identifiers of additional records. Numerous tracking schemes supported by the universal tracking system are disclosed. Also, applications for the universal tracking system, including an ISO implementation, are disclosed.

27 Claims, 25 Drawing Sheets

FIG. 2a

| Grandfather | Father | Son |
|---|---|---|
| A1 | B1 | C1 |
| A1 | B2 | C2 |
| A1 | B3 | C3 |

FIG. 2b

| Grandfather | Father | Son |
|---|---|---|
| 97010 | 00000 | 00001 |
| 97010 | 10000 | 00023 |
| 97010 | 30000 | 00044 |

FIG. 2c

| Grandfather | Father | Son |
|---|---|---|
| A1 | B1 | B2 |
| A1 | B3 | B4 |
| A1 | B5 | B6 |

FIG. 2d

| Grandfather | Father | Son |
|---|---|---|
| 97PLN | 00001 | 00002 |
| 97PLN | 00003 | 00004 |
| 97PLN | 00005 | 00004 |

FIG. 3a

| Grandfather | Father | Son |
|---|---|---|
| A1 | B1 | C1 |
| A2 | B1 | C2 |
| A3 | B1 | C3 |

FIG. 3b

| Grandfather | Father | Son |
|---|---|---|
| 97010 | 10000 | 00001 |
| 96010 | 10000 | 00023 |
| 95010 | 10000 | 00044 |

FIG. 3c

| Grandfather | Father | Son |
|---|---|---|
| A1 | B1 | A2 |
| A3 | B1 | A4 |
| A5 | B1 | A6 |

FIG. 3d

| Grandfather | Father | Son |
|---|---|---|
| 10001 | 10000 | 10002 |
| 10003 | 10000 | 10004 |
| 10005 | 10000 | 10006 |

FIG. 4a

| Grandfather | Father | Son |
|---|---|---|
| A1 | B1 | C1 |
| A2 | B2 | C1 |
| A3 | B3 | C1 |

FIG. 4b

| Grandfather | Father | Son |
|---|---|---|
| 97010 | 10000 | 00001 |
| 96010 | 20000 | 00001 |
| 95010 | 30000 | 00001 |

FIG. 5a

| Grandfather | Father | Son |
|---|---|---|
| A1 | B1 | C1 |
| A1 | B1 | C2 |
| A1 | B1 | C3 |

FIG. 5b

| Grandfather | Father | Son |
|---|---|---|
| 97010 | 10000 | 00001 |
| 97010 | 10000 | 00002 |
| 97010 | 10000 | 00003 |

FIG. 6a

| Grandfather | Father | Son |
|---|---|---|
| A1 | B1 | C1 |
| A2 | B1 | C1 |
| A3 | B1 | C1 |

FIG. 6b

| Grandfather | Father | Son |
|---|---|---|
| 97010 | 10000 | 00001 |
| 96010 | 10000 | 00001 |
| 95010 | 10000 | 00001 |

FIG. 7a

| Grandfather | Father | Son |
|---|---|---|
| A1 | B1 | C1 |
| A1 | B2 | C1 |
| A1 | B3 | C1 |

FIG. 7b

| Grandfather | Father | Son |
|---|---|---|
| 97010 | 10000 | 00001 |
| 97010 | 20000 | 00001 |
| 97010 | 30000 | 00001 |

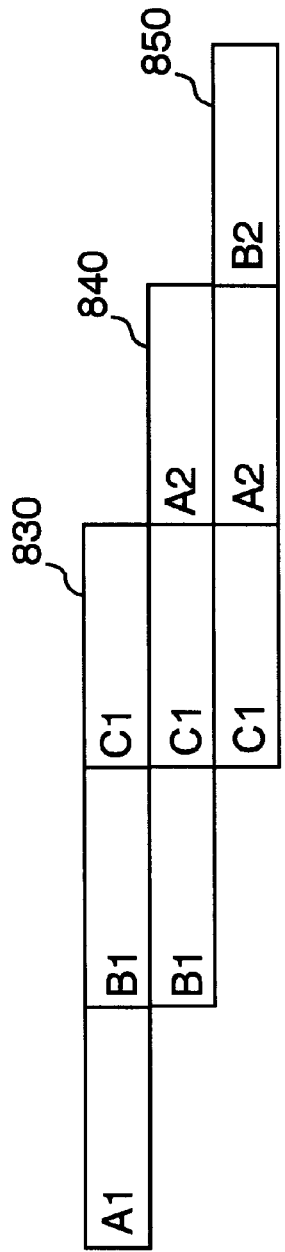

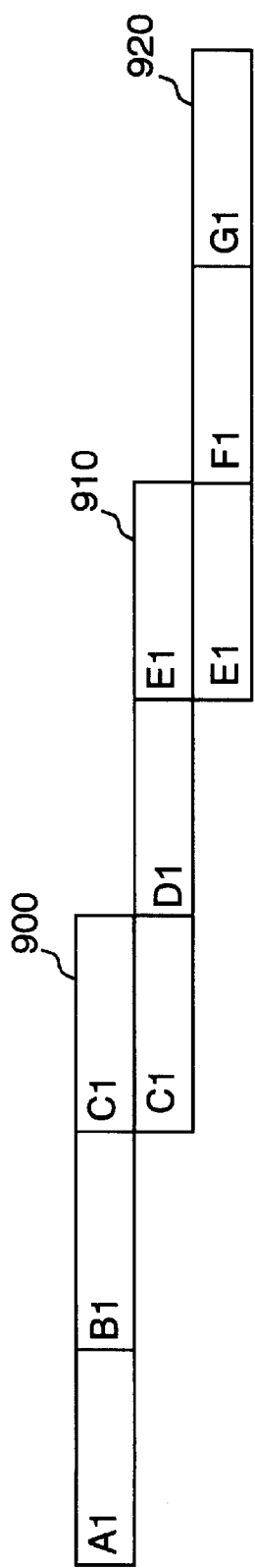

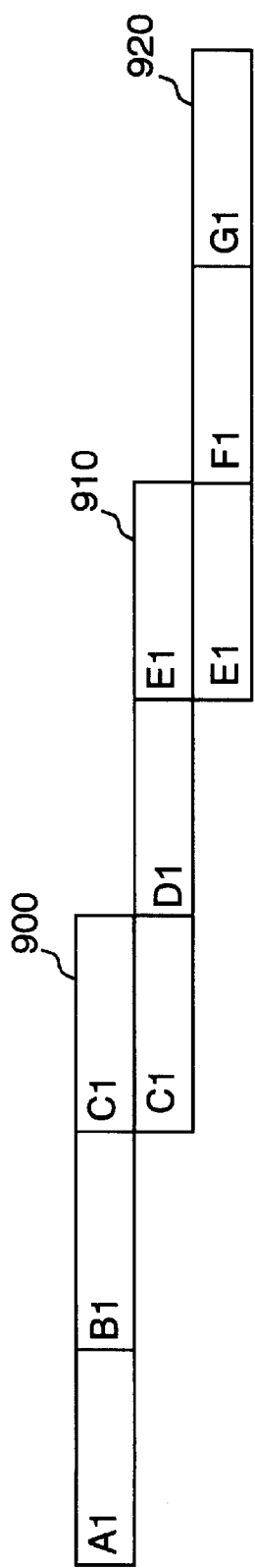

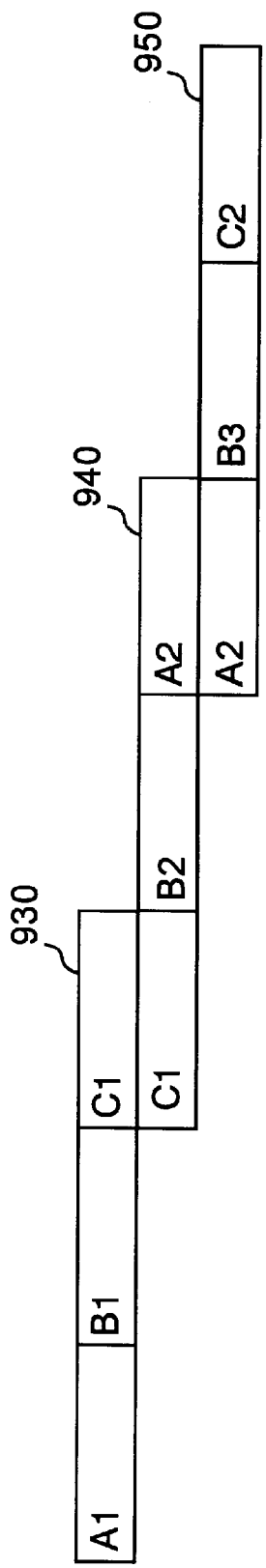

FIG. 9g

| A1 | B1 | A2 | B2 | A3 | | |
|----|----|----|----|----|--|--|
|    |    | A2 |    | A3 | B3 | A4 |

FIG. 9h

| A1 | B1 | A2 |
| A2 | B2 | A3 |
| A3 | B3 | A4 |

FIG. 9i

| 10000 | PLAN1 | 10001 |
| 10001 | BLDG1 | 10002 |
| 10003 | CODE1 | 10004 |

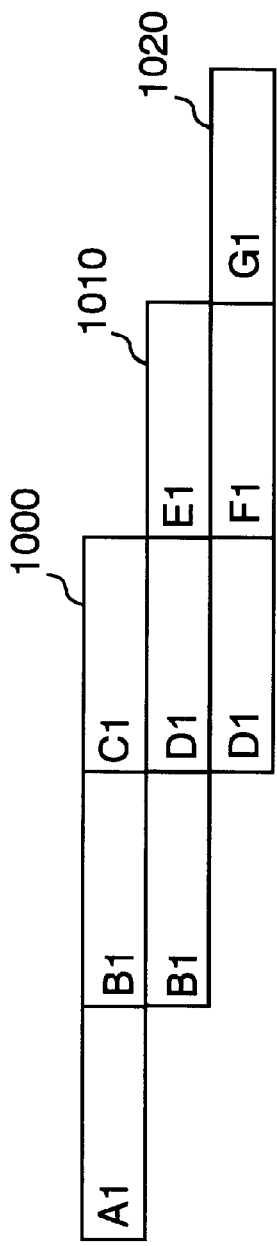

FIG. 10d

| A1 | A2 | B1 |    |    |
|----|----|----|----|----|
|    | A2 | A3 | B2 |    |
|    |    | A3 | A4 | B3 |

FIG. 10e

| A1 | A2 | B1 |
|----|----|----|
| A2 | A3 | B2 |
| A3 | A4 | B3 |

FIG. 10f

| 10000 | 10001 | PLAN1 |
|-------|-------|-------|
| 10001 | 10002 | BLDG1 |
| 10003 | 10004 | CODE1 |

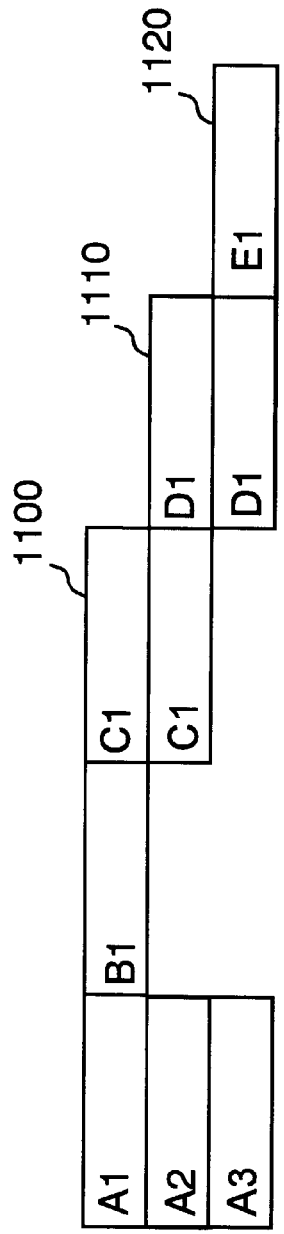

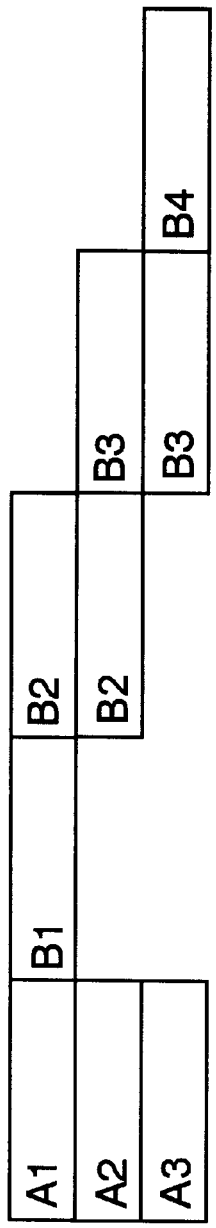

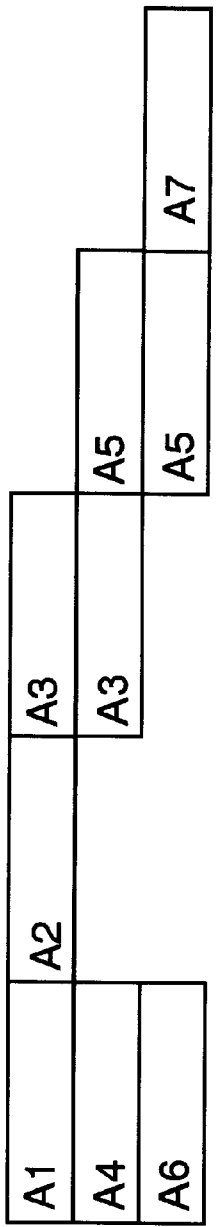

FIG. 12

| Grandfather | Father | Son |
|---|---|---|
| ISO Standard | Management Responsibilities | VP Marketing |
| ISO Standard | Management Responsibilities | VP Production |
| ISO Standard | Management Responsibilities | Foreman |
| ISO Standard | Management Responsibilities | Assembly Worker |
| ISO Standard | Contract Review | Major Contract |
| ISO Standard | Contract Review | Minor Contract |
| ISO Standard | Design Control | Design Planning |
| ISO Standard | Design Control | Design Input |
| ISO Standard | Design Control | Design Output |
| ISO Standard | Design Control | Design Review |
| ISO Standard | Design Control | Design Verification |
| ISO Standard | Design Control | Design Validation |
| Corporate Policy | Management Responsibilities | VP Marketing |
| Corporate Policy | Management Responsibilities | VP Production |
| Corporate Policy | Management Responsibilities | Foreman |
| Corporate Policy | Management Responsibilities | Assembly Worker |
| Corporate Policy | Contract Review | Major Contract |
| Corporate Policy | Contract Review | Minor Contract |
| Corporate Policy | Design Control | Design Planning |
| Corporate Policy | Design Control | Design Input |
| Corporate Policy | Design Control | Design Output |
| Corporate Policy | Design Control | Design Review |
| Corporate Policy | Design Control | Design Verification |
| Corporate Policy | Design Control | Design Validation |
| ABC Client | Management Responsibilities | VP Marketing |
| ABC Client | Management Responsibilities | VP Production |
| ABC Client | Management Responsibilities | Foreman |
| ABC Client | Design Control | Design Planning |
| ABC Client | Design Control | Design Review |
| ABC Client | Delivery | Final QA |
| ABC Client | Delivery | Packaging |
| ABC Client | Delivery | Shipping |

FIG. 13

| Grandfather | Father | Son |
|---|---|---|
| Project 1 | Version 0 | Version 1.0 |
| Project 1 | Version 1.0 | Version 2.0 |
| Project 1 | Version 2.0 | Version 2.1 |
| Project 1 | Version 2.1 | Version 3.0 |
| Project 2 | Version 0 | Version 1.0 |
| Project 2 | Version 1.0 | Version 2.0 |
| Project 2 | Version 2.0 | Version 2.1 |
| Project 2 | Version 2.1 | Version 3.0 |

FIG. 14

| Grandfather | Father | Son |
|---|---|---|
| Cancer Research #1 | Patient Group 5 | Patient 505 |
| Cancer Research #1 | Patient Group 5 | Patient 506 |
| Cancer Research #1 | Patient Group 5 | Patient 507 |
| Patient 505 | Test Result History | Test Result Current |
| Patient 505 | Test Result Current | Test Result After |
| Patient 506 | Test Result Year 0 | Test Result Year 1 |
| Patient 506 | Test Result Year 1 | Test Result Year 2 |
| Patient 506 | Test Result Year 49 | Test Result Year 50 |

FIG. 15a

| Grandfather | Father | Son |
|---|---|---|
| Year1-Subdivision Permit | Project # for subdivision A | Project #1 |
| Year2-Subdivision Permit | Project # for subdivision A | Project #2 |
| Year3-Subdivision Permit | Project # for subdivision A | Project #3 |
| Year3-Building Permit | Project # for subdivision A | Project #3 |
| Year3-Electrical Permit | Project # for subdivision A | Project #3 |

FIG. 15b

| Grandfather | Father | Son |
|---|---|---|
| parcel # part A1 | parcel # part A2 | parcel # part A3 |
| parcel # part A4 | parcel # part A2 | parcel # part A3 |
| parcel # part A5 | parcel # part A2 | parcel # part A3 |
| parcel # ID 1# | parcel # Book/Page 1 | parcel # Tact 1 |
| parcel # ID 1a# | parcel # Book/Page 1 | parcel # Tact 1 |
| parcel # ID 2# | parcel # Book/Page 2 | parcel # Tact 2 |
| parcel # ID 2# | parcel # Book/Page 2a | parcel # Tact 2a |

FIG. 15c

| Grandfather | Father | Son |
|---|---|---|
| parcel # part A1 | parcel # part A2 | parcel # part A3 |
| parcel # part A2 | parcel # part A3 | parcel # part A4 |
| parcel # part A3 | parcel # part A4 | parcel # part A5 |

FIG. 16

| Grandfather | Father | Son |
|---|---|---|
| Batch # 1 | Location 1 (source) | Location 2 (destination) |
| Batch # 1 | Location 2 (source) | Location 3 (destination) |
| Batch # 1 | Location 3 (source) | Location 4 (destination) |

FIG. 17

| Grandfather | Father | Son |
|---|---|---|
| Vessel # 1 | Route # 1 | Voyage # 1 |
| Vessel # 1 | Route # 1 | Voyage # 99 |
| Vessel # 1 | Route # 3 | Voyage # 1 |
| Vessel # 1 | Route # 3 | Voyage # 99 |
| Vessel # 2 | Route # 3 | Voyage # 1 |
| Vessel # 2 | Route # 3 | Voyage # 99 |
| Vessel # 2 | Service Type # 1 | Maintenance # 1 |
| Vessel # 2 | Service Type # 1 | Maintenance # 99 |
| Vessel # 2 | Connect # 1 | Vessel # 3 |
| Vessel # 3 | Connect # 99 | Vessel # 4 |
| Vessel # 2 | Voyage # 1 | Container # 1 |
| Vessel # 2 | Voyage # 1 | Container # 2 |
| Voyage # 1 | Container # 2 | Cargo # 1 |
| Voyage # 99 | Container # 99 | Cargo # 99 |
| Account # 1 | Voyage # 1 | Container # 2 |
| Account # 1 | Voyage # 99 | Container # 99 |

FIG. 18

| Grandfather | Father | Son |
|---|---|---|
| Tracking Space | | |
| Big Bang #1 | Galaxy Cluster #1 | Galaxy #1 |
| Galaxy #1 | Solar System #1 | Planet-Mercury |
| Galaxy #1 | Solar System #1 | Planet-Earth |
| Planet-Earth | Continent-North America | Country-USA |
| Country-USA | State of California | Silicon Mine #1 |
| Silicon Mine #1 | Mining Batch #1 | Silicon Crystal #1 |
| Silicon Crystal #1 | Pentinum Photo Mask #1 | Pentinum CPU #1 |
| Pentinum CPU #1 | Account-OpenData | Owner-Ho Wing Sit |

FIG. 19

| Grandfather | Father | Son |
|---|---|---|
| Tracking Time | | |
| Planet Earth | Time - August 7, 1980 | Country-USA |
| Country-USA | Time - August 7, 1980 | Silicon Mine #1 |
| Silicon Mine #1 | Time - August 7, 1980 | Silicon Crystal #1 |
| Silicon Crystal #1 | 286 Photo Mask #1 | 286 CPU #1 |
| 286 CPU #1 | Account-Royal Design | Owner-Ho Wing Sit |
| 286 CPU #1 | Time - August 7, 1997 | Condition - Junk |
| Pentinum CPU #1 | Time - August 7, 1997 | Condition - Excellent |

FIG. 20a

| Grandfather | Father | Son |
|---|---|---|
| 10000 | 20000 | 30000 |
| 30000 | 40000 | 50000 |
| 50000 | 60000 | 70000 |

FIG. 20b

| Grandfather | Father | Son |
|---|---|---|
| 10001 | 10002 | 10003 |
| 10003 | 10004 | 10005 |
| 10005 | 10006 | 10007 |

FIG. 21

| Grandfather | Father | Son |
|---|---|---|
| 10001 | 10000 | 10002 |
| 10003 | 10000 | 10004 |
| 10005 | 10000 | 10006 |

FIG. 22

| Grandfather | Father | Son |
|---|---|---|
| 10001 | 10002 | 10003 |
| 10004 | 10003 | 10005 |
| 10006 | 10005 | 10007 |

METHODS AND APPARATUS FOR A UNIVERSAL TRACKING SYSTEM

BACKGROUND OF THE INVENTION

1. Field of the Invention

The present invention is directed toward the field of tracking information, and more particularly to a universal tracking system.

2. Art Background

With the widespread use of computers, databases have become an important part of storing and accessing information for businesses and organizations. In general, databases are used to store all types of information pertaining to a variety of subjects. One type of database is a relational database. Relational databases have become the preferred way of storing data, particularly in applications that are large and complex. In general, relational databases consist of storing information in tables. Relational databases further provide a means, using queries, to relate different tables to extract desired information. Database tables consist of columns, typically associated with a field or variable, and rows, or records, that include specific data for the columns of the table.

Many applications, which use databases to store information, involve relating or tracking between one or more records of the database. For example, a database may consist of land parcel transactions that occur in a particular jurisdiction. For this example, each record identifies a parcel, a grantor of the parcel (i.e., the person/entity selling the parcel), and a grantee of the parcel (i.e., the person/entity buying the parcel). Typically, information for each land parcel transaction is entered at the time of the transaction. Thus, for this example application, the database contains records for each transaction; however, the records are not related to one another. It is desirable to provide a means to efficiently relate one or more records in a database. For example, in the land parcel transaction application, it is desirable to track ownership of a parcel to determine the chain of owners throughout history of the parcel.

One prior art method of tracking relationships among records involves assigning a tracking number to each record. Typically, for this application, the tracking number is the primary key that identifies a relational database table. The tracking number, generated for each record, typically consists of a single fixed length field. For example, the tracking number may include a single field 8–12 digits in length. Database records are then augmented to include the tracking number. To implement a tracking application, a computer program parses the tracking number to format the tracking number into a meaningful manner (e.g., ascribe meanings to digits of the tracking number). For the land parcel trsaction example, to parse a twelve digit tracking number, a computer program may read the first three digits to determine a year of the land conveyance. The next nine digits are then read by the computer program to determine an identification of the parcel. As shown by this example, a computer program or parsing procedure is required to determine what the digits or fields in a tracking number mean. When the pre-parsing or formatting occurs during run time, the performance of the system is degraded substantially. Accordingly, it is one object of the present invention to minimize the processing required to format or parse fields for tracking applications.

SUMMARY OF THE INVENTION

A universal tracking system is extremely versatile to permit tracking records in a database for any type of tracking application. A tracking identifier for a database record includes a plurality of fields of equal length. In one embodiment, the tracking identifier is pre-parsed into three fields of equal length. A tracking value, stored in the tracking identifier, tracks relationships among records. Specifically, for a particular application, tracking values are generated to associate one or more fields of a tracking identifier of a first record with one or more fields of a tracking identifier of another record being tracked to the first record.

In one embodiment, the fields of the tracking identifier are assigned field identifiers to ascribe meanings to the fields. In one implementation for a tracking system that involves related objects, a field identifier of one field defines an object that is related to an object defined by one or more other field identifiers in the tracking identifier. For example, a first field of a tracking identifier may define a subdivision, and a second field of the tracking identifier may define a lot number for the subdivision defined by the first field. In one implementation for a tracking system that involves events or data associated with time, a field identifier of one field defines an event temporally related to an event defined by one or more other field identifiers in the tracking identifier. For example, a first field of a tracking identifier may define test data from a previous point in time, and a second field of the tracking identifier may define current test data.

The use of three fields per tracking identifier is sufficient to implement tracking systems, even tracking systems that involve many relationships. In general, field identifiers from one record may be extended to field identifiers of additional records. For example, if a tracking system requires six fields to identify six types of data (e.g., six different field identifiers), then two records, with three fields each, may be associated together to implement the tracking system. Similarly, any number of records may be associated together to generate as many unique field identifiers required for a particular tracking application.

The universal tracking system permits implementing numerous tracking schemes. In one embodiment for implementing tracking schemes, records are tracked through a single predetermined field of the tracking identifier. For example, records may be tracked through generation of equivalent tracking values for each grandfather field of a record being tracked. The equal length fields of the tracking identifier in the universal tracking system permit tracking th rough both multiple and different fields of the tracking identifier. In another embodiment for implementing tracking schemes, records are tracked through different fields of the tracking identifier. For example, two records may be tracked through generation of a tracking value for a son field of a first record and through generation of the same tracking value for a grandfather field of a second record being tracked. In an implementation that tracks multiple fields, a first tracking value is generated for one field of a first record, and a second tracking value is generated for a different field of the first record. In a second record being tracked to the first record, the first tracking value is generated for one field, and the second tracking value is generated for a different field.

The tracking system of the present invention further permits implementation of multiple tracking schemes on a set of records. In general, to implement multiple tracking schemes, tracking values are generated to track relationships between at least two additional records, that associates one or more different fields of a tracking identifier of a record with one or more fields of a tracking identifier of another record associated with that record. For example, a tracking system may track a first set of records in a database through a first field to first field relationship (e.g., a grandfather to grandfather relationship), and track a second set of records in the database through a third field to first field relationship (e.g., a son to grandfather relationship). In one embodiment, the universal tracking system utilizes one or more relational sequence number generators. The relational sequence number generators operate based on pre-determined sequence of identifiers, for assignment to tracking identifiers, and operate in accordance with at least one tracking scheme. In general, a relational sequence number generator assigns, for a tracking value of a field, the next identifier in the sequence of identifiers if the field is not a tracking field used in the tracking scheme to associate records. Alternatively, a relational sequence number generator assigns, for a value of a field, an identifier previously assigned to track a record being tracked.

BRIEF DESCRIPTION OF THE DRAWINGS

FIG. 2a illustrates a first embodiment for implementing a grandfather to grandfather tracking scheme.

FIG. 2b illustrates an example table for the grandfather to grandfather tracking scheme shown in FIG. 2a.

FIG. 2c illustrates a second embodiment for implementing a grandfather to grandfather tracking scheme.

FIG. 2d illustrates example values for the second embodiment of the grandfather to grandfather tracking scheme shown in FIG. 2c.

FIG. 3a illustrates a generalized table for implementing one embodiment of a father to father tracking scheme.

FIG. 3b illustrates an example table for the father to father tracking scheme of FIG. 3a.

FIG. 3c illustrates a second embodiment for implementing a father to father tracking scheme.

FIG. 3d illustrates an example table for the father to father tracking scheme of FIG. 3c.

FIG. 4a illustrates a generalized table for one embodiment to implement a son to son tracking scheme.

FIG. 5a illustrates a generalized table for one embodiment to implement a grandfather-father to grandfather-father tracking scheme.

FIG. 5b illustrates an example table for the grandfather-father to grandfather-father tracking scheme of FIG. 5a.

FIG. 6a illustrates a generalized table that implements a father-son to father-son tracking scheme.

FIG. 6b illustrates an example table that implements the father-son to father-son tracking scheme of FIG. 6a.

FIG. 7a illustrates a generalized table that implements one embodiment for a grandfather-son to grandfather-son tracking scheme.

FIG. 7b is an example of the grandfather-son to grandfather-son tracking scheme embodiment of FIG. 7a.

FIG. 8a illustrates a generalized table for implementing a father-son to grandfather-father tracking scheme.

FIG. 8b illustrates a generalized table for the father-son to grandfather-father tracking scheme of FIG. 8a, without aligning the overlapping fields.

FIG. 8c illustrates an example table for the father-son to grandfather-father tracking schemes of FIGS. 8a and 8b.

FIG. 8d illustrates a generalized table for implementing a second embodiment of a father-son to grandfather-father tracking scheme.

FIG. 8e illustrates a generalized table for the father-son to grandfather-father second embodiment tracking scheme shown in FIG. 8d.

FIG. 8f illustrates an example table that implements the second embodiment father-son to grandfather-father tracking scheme.

FIG. 9a illustrates a generalized table to implement one embodiment of a son to grandfather tracking scheme.

FIG. 9b illustrates the generalized table of FIG. 9a with the grandfather, father and son fields aligned.

FIG. 9c illustrates an example table for the son to grandfather tracking scheme embodiments of FIGS. 9a and 9b.

FIG. 9d illustrates a generalized table that implements a second embodiment for the son to grandfather tracking scheme.

FIG. 9e illustrates a generalized table for the second embodiment of the son to grandfather tracking scheme without overlapping fields.

FIG. 9f illustrates an example table, with numeric and alphanumeric values, based on the second embodiment of the son to grandfather tracking scheme.

FIG. 9g illustrates a generalized table for a third embodiment of the son to grandfather tracking scheme.

FIG. 9h shows the generalized table for the third embodiment aligned in the grandfather, father and son fields.

FIG. 9i shows an example table with values, including numeric and alphanumeric, for the third embodiment of the son to grandfather tracking scheme.

FIG. 10a illustrates a generalized table that implements one embodiment of the father to grandfather tracking scheme.

FIG. 10b illustrates a generalized table, with all records aligned in the grandfather, father and son fields, for the first embodiment of FIG. 10a.

FIG. 10c shows an example table with alphanumeric and numeric values for the first embodiment of the father to grandfather tracking scheme.

FIG. 10d illustrates a generalized table, showing overlapping tracking positions, for a second embodiment of the father to grandfather tracking scheme.

FIG. 10e illustrates a table for the second embodiment for the father to grandfather scheme with the columns organized in their respective grandfather, father and son fields.

FIG. 10f illustrates an example table, with alphanumeric and numeric values, for the second embodiment of the father to grandfather tracking scheme.

FIG. 11a illustrates a generalized table for implementing a first embodiment of a son to father tracking scheme.

FIG. 11b shows the generalized table of FIG. 11a with the records organized in their respective grandfather, father and son fields.

FIG. 11c shows an example table, with both alphanumeric and numeric values, for the first embodiment of the son to father tracking scheme.

FIG. 11d illustrates a generalized table for a second embodiment for a son to father tracking scheme.

FIG. 11e shows the second embodiment of the son to father tracking scheme with the records organized in their respective grandfather, father and son fields.

FIG. 11f shows an example database table for the second embodiment, including numeric and alphanumeric values.

FIG. 11g illustrates a generalized table for a third embodiment of the son to father tracking scheme.

FIG. 11h shows the third embodiment with the records a ranged in their respective grandfather, father and son fields.

FIG. 11i shows an example database table with values generated from the single sequence generator.

FIG. 12 illustrates an example table for implementing the ISO 9000 standard through use of the universal tracking system.

FIG. 13 illustrates an example table for tracking and enforcing a development version control system.

FIG. 14 is an example table that illustrates tracking and enforcing a drug development process.

FIG. 15a illustrates an example table that tracks project numbers for specified subdivisions.

FIG. 15b illustrates an example table for tracking of parcel information.

FIG. 15c illustrates an example table for tracking parcel number and part identifications.

FIG. 16 shows an example table for implementing a hazardous material management process tracking scheme.

FIG. 17 illustrates an example table for implementing a transportation management process tracking scheme.

FIG. 18 is an example table that tracks spatial relationships of objects in the universe.

FIG. 19 illustrates an example table that tracks time.

FIG. 20a illustrates an example database table that uses a relational sequence number generator for a son to grandfather tracking scheme.

FIG. 20b illustrates another scheme for creating relational sequence numbers.

FIG. 21 illustrates an example table created by a relational sequence generator that implements a father to father tracking scheme.

FIG. 22 illustrates an example table created by a relational sequence generator that implements a son to father tracking scheme.

DETAILED DESCRIPTION OF THE PREFERRED EMBODIMENTS

The universal tracking system of the present invention pre-parses or formats tracking identifiers to facilitate tracking. In general, tracking identifiers used to track among records, are divided between two or more fields. One or more of the fields are then used to track records in a database. Thus, no pre-processing or pre-parsing on database fields is required to interpret the meaning of digits within the tracking identifier.

In the preferred embodiment, the universal tracking system preformats or parses fields into equal lengths. For example, a tracking identifier may consist of three positions or fields, each independently accessible in the database. For this embodiment, the fields are of equal length to permit comparison of fields or positions of one record with different fields or positions of another record. This "overlapping" of fields permits many tracking permutations, and thus the universal tracking system is an extremely versatile tracking system. Embodiments that overlap different positions of the tracking identifier are described more fully below.

In a preferred embodiment, each field of the tracking identifier comprises five digits. The optimal number of digits in a field is based on the particular tracking application. For example, a tracking application that requires only 10,000 unique tracking numbers may use a tracking identifier that consists of four digits per field. However, a four digit per field tracking identifier would not satisfy an application that may include hundreds of thousands of records.

Other implementations of the universal tracking system may include more than five digits per position or field. For example, one implementation may include the use of six digits per field, resulting in a tracking number of eighteen digits. An embodiment that implements seven digits per position provides a 21 digit tracking identifier to generate unique tracking values. However, applications that use larger tracking identifiers have practical and performance limitations. For example, if the tracking system operates in conjunction with an interactive voice response system, then a tracking identifier of 21 digits requires the user to enter 21 digits, a number impractical for such a system.

Figure 1:
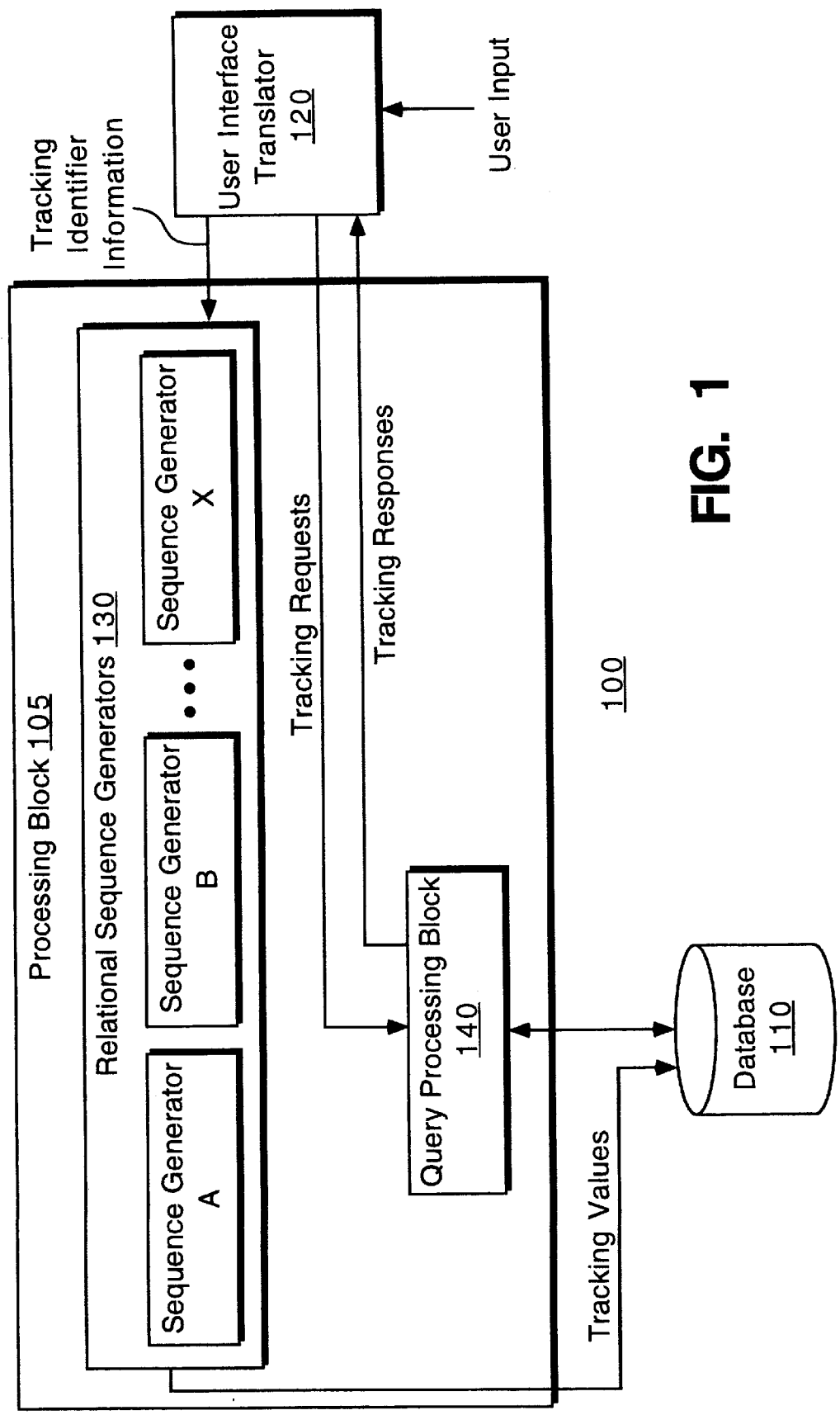
FIG. 1 is a block diagram illustrating one embodiment for the universal tracking system of the present invention.

FIG. 1 is a block diagram illustrating one embodiment for the universal tracking system of the present invention. The universal tracking system 100 comprises a processing block 105, a database 110, and a user interface translator 120. In general, the processing block 105 receives, as input, tracking identifier information and tracking requests, and generates, as output, tracking responses and records for a database 110. In one embodiment, the database 110 is a relational database. However, database 110 may comprise an object oriented database or may contain records organized in a flat file system. The database 110 may comprise any type of commercially available relational database, such as a database produced by Oracle Corporation, Sybase Corporation, or Informix Corporation.

The processing block 105 includes a query processing block 140 and relational sequence generators 130. In general, the query processing block 140 receives tracking requests from the user interface translator 120, and extracts information from the database 110 based on the tracking request. In one embodiment, the query processing block 140 directly receives SQL commands to execute queries on the database 110. The function of the query processing block 140, which queries a database based on an input from a fourth generation language, is well known in the art and will not described further.

The relational sequence generators 130 generate tracking values, for the tracking identifiers, in accordance with a pre-defined tracking scheme. In general, the relational sequence generators 130 generate tracking values for records, as a means to input data into records of the database, to set-up the universal tracking system. The relational sequence generators 130 are described more fully below.

The user interface translator 120 provides an interface from the processing block 105 to the user to facilitate both querying and set-up of the universal tracking system. For example, the interface translator 120 may provide a means for the user to generate different types of records sought to be tracked in the universal tracking system. As described below, the user inputs information to generate a new record in accordance with a particular tracking system application.

Universal Tracking System Tracking Embodiments

FIGS. 2a–11i illustrate embodiments for tracking schemes of the universal tracking system. To illustrate these embodiments, some of the Figures show generalized tables (See FIGS. 2a, 2c, 3a, 3c, 4a, 5a, 6a, 7a, 8a, 8b, 8d, 8e, 9a, 9b, 9d, 9e, 9g, 9h, 10a, 10b, 10d, 10e, 11a, 11b, 11d, 11e, 11g, and 11h). Each table includes three fields or positions: a grandfather field, a father field, and a son field. For purposes of explanation, the letters, labeled in the tables of these Figures, connote a particular relational sequence generator that generates values for the corresponding field. For the example shown in FIG. 2a, values stored in the grandfather field originate from relational sequence generator "A", values stored in the father field originate from relational sequence generator "B", and values stored in the son field originate from relational sequence generator "C." Also, for this convention, the number following the letter indicates a sequence number in a sequence for the respective relational sequence generator. For the example shown in FIG. 2a, the designations "A1", listed in the grandfather field of all three records, connote that the same values, generated from relational sequence generator A, are stored in these three fields. In the father field of the table illustrated in FIG. 2a, "B1", "B2", and "B3" designate three different sequential values generated by relational sequence generator "B." The designations "C1", "C2", and "C3", located in the son fields, connote three different sequential values that originate from the relational sequence generator "C."

FIGS. 2a–2d illustrate embodiments for a grandfather to grandfather tracking scheme. For a grandfather to grandfather tracking scheme, tracking among records occurs through the "grandfather" field (e.g., the first column in the tables of FIGS. 2a–2d). As shown in the embodiment of FIG. 2a, all tracking values in the grandfather field are designated "A1." Thus, all entries in the grandfather field store the same value (e.g., equivalent tracking values). In this way, the records are tracked through common value (e.g., A1).

FIG. 2b illustrates an example table for the grandfather to grandfather tracking scheme shown in FIG. 2a. The example table 210 includes example values. As shown in FIG. 2b, "A1" has a value of "97010." The value "97010" may signify both a year (i.e., 1997), and an additional identifier (i.e., 010). Because each record in table 210 contains the tracking value "97010" in the grandfather field, then all records may be tracked through the value "97010." The values in the father field, generated from the "B" sequence generator, are "00000", "10000", "30000." Similarly, the son field includes three unique values generated from the "C" sequence generator.

FIG. 2c illustrates a second embodiment for implementing a grandfather to grandfather tracking scheme. Similar to the embodiment shown in FIG. 2a, all records store, in the grandfather field, an equivalent tracking value, "A1", to permit tracking among all records that include the value "A1" in the grandfather field. However, for the embodiment shown in FIG. 2c, a single sequence generator, "B", generates values for both the father and son fields. This embodiment has application for use in tracking systems that track temporal relationships, such as tracking systems that relate data to a specific time. FIG. 2d illustrates example values for the second embodiment of the grandfather to grandfather tracking scheme shown in FIG. 2c. The "A1" value, stored in the grandfather field, is "97 PLN." The "B" sequence generator generates sequential values for entries in the father and son fields (i.e., 00001–00006).

The universal tracking system also supports tracking implementations that track through father to father relationships. FIG. 3a illustrates a generalized table for implementing one embodiment of a father to father tracking scheme. For all records, each entry in the father field stores the value "B1." Thus, for the father to father tracking scheme, records of the table are tracked through the father field. For the embodiment shown in FIG. 3a, sequence generator "A" generates values for the grandfather fields, and a sequence generator "C" generates values for the son fields.

FIG. 3b illustrates an example table for the father to father tracking scheme of FIG. 3a. The father field, or second column, for which records are tracked, contains the value "10000." The grandfather field contains unique numbers generated from the "A" sequence generator. Similarly, the son field contains unique numbers generated from sequence generator "C."

FIG. 3c illustrates a second embodiment for implementing a father to father tracking scheme. Similar to the tracking scheme of FIG. 3a, the second embodiment includes a single value for each entry in the father field. However, for the second embodiment, a single sequence generator, "A", generates values for both the grandfather and son fields. An example table for implementing the second embodiment of the father to father tracking scheme is shown in FIG. 3d. For this example, the single sequence generator "A" generates sequential values as a numbering scheme (i.e., 100001, 10002, 10003, etc.).

The pre-parsed format of the universal tracking system further permits tracking through son to son relationships. FIG. 4a illustrates a generalized table for one embodiment to implement a son to son tracking scheme. A sequence generator, designated "C", generates equivalent values for the son field of each record being tracked to permit tracking among records through the son field. For this embodiment, two different sequence generators, one for the grandfather field and one for the son field, are used (e.g., "A" for the grandfather field and "C" for the son field).

FIG. 4b illustrates an example table in accordance with the son to son tracking scheme of FIG. 4a. The example records are tracked by the "000001" tracking value, stored in the son field of each record. Unique values are generated for each entry, in the grandfather and father fields, in accordance with a numbering scheme for the corresponding sequence generator. A second embodiment for a son to son tracking scheme includes a single sequence generator that generates values for both the grandfather and father fields.

The pre-parsing format of the universal tracking system permits tracking through multiple fields. FIG. 5a illustrates a generalized table for one embodiment to implement a grandfather-father to grandfather-father tracking scheme. For this tracking scheme, records are tracked through common values in the grandfather-father field (i.e., columns 1 and 2). For the embodiment shown in FIG. 5a, a sequence generator "A" generates equivalent tracking values for the grandfather field, and a sequence generator "B" generates equivalent tracking values for the father field. For the son field, a sequence generator "C" generates unique values for each record.

FIG. 5b illustrates an example table for the grandfather-father to grandfather-father tracking scheme of FIG. 5a. For this example, records are tracked through the values "97010" and "10000" stored in the grandfather and father fields, respectively. The sequence generator "C" generates sequential values for the son field of records.

A second tracking scheme that uses multiple fields may track through father-son to father-son relationships. FIG. 6a illustrates a generalized table that implements a father-son to father-son tracking scheme. Entries for the father field, or column 2, are generated by a "B" sequence generator, and values for the son field, or this 1d column, are generated by sequence generator "C." The sequence generator "B" generates equivalent values for father fields of each record tracked. Similarly, the sequence generator "C" generates equal values for entries in the son field for records being tracked. Values for the grandfather field are generated through sequence generator "A."

FIG. 6b illustrates an example table that implements the father-son to father-son tracking scheme of FIG. 6a. As shown in FIG. 6b, the example table contains the value "10000" in the father field of each record, and it contains the value "00001" in the son field for each record. The "A" sequence generator generates unique values for storage in the grandfather field as shown in FIG. 6b.

Another tracking scheme that tracks records through multiple fields is a grandfather-son to grandfather-son tracking scheme. FIG. 7a illustrates a generalized table that implements one embodiment for a grandfather-son to grandfather-son tracking scheme. For this scheme, records are tracked through storing common or equivalent values in both the grandfather and son fields for each record tracked. This is shown in FIG. 7a through storage of "A1" and "C1" values in the grandfather and son fields, respectively. The father field contains unique values for the different records. FIG. 7b is an example of the grandfather-son to grandfather-son tracking scheme embodiment of FIG. 7a. The value "A1" is "97010", and the value for "C1" is "00001."

As discussed above, the equal length fields in the universal tracking system permit tracking by overlapping different column or field positions. One embodiment for overlapping equal sized fields of the tracking identifier permits implementing a father-son to grandfather-father tracking scheme. The father-son to grandfather-father tracking scheme involves overlapping two fields in different positions to track records. FIG. 8a illustrates a generalized table for implementing a father-son to grandfather-father tracking scheme. FIG. 8a shows the overlap between the father-son fields of record 800 to the grandfather-father fields of record 810. A sequence generator "B" generates equivalent values for the father field of record 800, as well as the grandfather field of record 810. Similarly, a sequence generator "C" generates equal values for the son field in record 800 and the father field of record 810. To permit tracking between records 810 and 820, equivalent values are stored in the father field of record 810 and the grandfather field of record 820, and equivalent values are stored in the son field of record 810 and the father field of record 820. FIG. 8b illustrates a generalized table for the father-son to grandfather-father tracking scheme of FIG. 8a, without aligning the overlapping fields. FIG. 8c illustrates an example table for the father-son to grandfather-father tracking schemes of FIGS. 8a and 8b.

FIG. 8d illustrates a generalized table for implementing a second embodiment of a father-son to grandfather-father tracking scheme. The second embodiment for the father-son to grandfather-father tracking scheme involves use of fewer sequence generators. In general, for the second embodiment, a sequence generator is used to generate the next value in a sequence two fields shifted to the right when overlapping the fields as shown in FIG. 8d. Specifically, sequence generator "A" generates values for the grandfather field of record 830, the son field of record 840, and the father field of record 850. The sequence generator "B" generates values for the father field of record 830, the grandfather field of record 840, as well as the son field of record 850.

FIG. 8e illustrates a generalized table for the father-son to grandfather-father second embodiment tracking scheme shown in FIG. 8d. The columns of the table of FIG. 8e are not shifted to show the overlapping father-son to grandfather-father fields. FIG. 8f illustrates an example table that implements the second embodiment father-son to grandfather-father tracking scheme. As shown in FIG. 8f, the values for this example are alphanumeric.

Another tracking scheme that utilizes the equal size fields of the universal tracking system, by overlapping the fields, is a son to grandfather tracking scheme. FIG. 9a illustrates a generalized table to implement one embodiment of the son to grandfather tracking scheme. In the generalized table of FIG. 9a, three records are shown: record 900, record 910 and record 920. For the son to grandfather tracking scheme, the son field of record 900 is overlapped with the grandfather field of record 910. Similarly, the son field of record 910 is overlapped with the grandfather field of record 920. For the embodiment shown in FIG. 9a, a separate sequence generator is used for each unique field (i.e., for each field not being tracked), and the same sequence generator, which generates equivalent tracking values, is used to track between the son to grandfather fields of two records being tracked. FIG. 9b illustrates the generalized table of FIG. 9a with the grandfather, father and son fields aligned. FIG. 9c illustrates an example table for the son to grandfather tracking scheme embodiments of FIGS. 9a and 9b.

FIG. 9d illustrates a generalized table that implements a second embodiment for the son to grandfather tracking scheme. Again, the tracking fields, son and grandfather, are overlapped to show tracking among records 930, 940, and 950. However, for the second embodiment of the son to grandfather tracking scheme, only three sequence generators are used (i.e., sequence generators "A", "B", "C"). As shown in FIG. 9d, to track between the son and grandfather fields, sequence generator "C" generates an equivalent tracking value for the son field of record 930 and the grandfather field of record 940. For the second embodiment, the sequence generator "A" generates values for the grandfather field, sequence generator "B" generates values for the father field, and sequence generator "C" generates values for the son field. FIG. 9e illustrates a generalized table for the second embodiment of the son to grandfather tracking scheme without overlapping fields. FIG. 9f illustrates an example table, with numeric and alphanumeric values, based on the second embodiment of the son to grandfather tracking scheme.

FIG. 9g illustrates a generalized table for a third embodiment of the son to grandfather tracking scheme. Similar to the schemes shown in FIGS. 9a and 9d, the son to grandfather fields are overlapped. However, in the third embodiment, only two sequence generators are used: sequence generator A for the son and grandfather fields; and sequence generator B for the father fields. FIG. 9h shows the generalized table for the third embodiment aligned in the grandfather, father and son fields. FIG. 9i shows an example table with values, including numeric and alphanumeric, for the third embodiment of the son to grandfather tracking scheme.

A father to grandfather tracking scheme further utilizes the overlapping field capability of the universal tracking system. FIG. 10a illustrates a generalized table that implements one embodiment of the father to grandfather tracking scheme. For the father to grandfather tracking scheme, records are tracked through equivalent values stored in the father field of a first record and the grandfather field in a second record being tracked. The generalized table of FIG. 10a shows overlapping of the father field of record 1000 with the grandfather field of record 1010, as well as the overlapping of the father field of record 1010 with the grandfather field of record 1020. For a first embodiment, a different sequence generator is used for each non-tracking field (e.g., grandfather field and son field of record 1000). FIG. 10b illustrates a generalized table, with all records aligned in the grandfather, father and son fields, for the first embodiment of FIG. 10a. FIG. 10c shows an example table with alphanumeric and numeric values for the first embodiment of the father to grandfather tracking scheme.

The universal tracking system supports different implementations of the father to grandfather tracking scheme. FIG. 10d illustrates a generalized table, showing overlapping tracking positions, for a second embodiment of the father to grandfather tracking scheme. In the second embodiment, two sequence generators are used, "A" and "B", to generate values in all the records. FIG. 10e illustrates a table for the second embodiment for the father to grandfather scheme with the columns organized in their respective grandfather, father and son fields. FIG. 10f illustrates an example table, with alphanumeric and numeric values, for the second embodiment of the father to grandfather tracking scheme.

The ability to overlap positions of records in the universal tracking system further permits implementing tracking through a son to father tracking scheme. FIG. 11a illustrates a generalized table for implementing a first embodiment of a son to father tracking scheme. As shown in FIG. 11a, record 1110 is shifted, relative to record 1100, to show the tracking between the son field of record 1100 and the father field of record 1110. Similarly, 1120 is shifted relative to record 1110 to show tracking through the son of record 1110 to the father field of 1120. In the first embodiment for the son to father tracking scheme, a different sequence generator is used to generate values for fields not used for tracking. FIG. 11b shows the generalized table of FIG. 11a with the records organized in their respective grandfather, father and son fields. FIG. 11c shows an example table, with both alphanumeric and numeric values, for the first embodiment of the son to father tracking scheme. FIG. 11d illustrates a generzed table for a second embodiment for a son to father tracking scheme. For the second embodiment, only sequence generators "A" and "B" are used. The second embodiment has application for use in tracking time related records, wherein the grandfather field uniquely identifies the record, and the father and son fields provide past and current data, respectively. Thus, a sequence of values are generated in the father and son fields of each successive record, with an equivalent value to track between the son field and father field. FIG. 11e shows the second embodiment of the son to father tracking scheme with the records organized in their respective grandfather, father and son fields. FIG. 11f shows an example database table for the second embodiment, including numeric and alphanumeric values.

FIG. 11g illustrates a generalized table for a third embodiment of the son to father tracking scheme. In the third embodiment, only a single sequence generator, "A", is used to generate values. FIG. 11h shows the third embodiment with the records arranged in their respective grandfather, father and son fields. FIG. 11i shows an example database table with values generated from the single sequence generator. As shown in FIG. 11i, a single sequence is generated for the values of the records, including equivalent values to track between the son and father fields.

Tracking and Enforcing an ISO 9000 Implementation

The universal tracking system of the present invention has application for use in implementing an ISO 9000 program. In general, the ISO 9000 standard helps companies and organizations continually improve their overall quality. For example, corporate policies, implemented to fulfill aspects of the ISO standard, are correlated to specific actions, such as work orders. In turn, to insure execution of the work order, a person or department is assigned responsibility for completion of the work order. Accountability to persons and departments provides the necessary feedback to implement the ISO 9000 standard.

FIG. 12 illustrates an example table for implementing the ISO 9000 standard through use of the universal tracking system. The first column, the grandfather field, includes entries for "ISO Standard", "Corporate Policy", and "ABC Client." For the "ISO Standard" entries in the grandfather field, the father field provides the task for the ISO standard implemented. For this example, several areas of focus are listed in the father field: "Management Responsibilities", "Contract Review", and "Design Control." The third column, the son field, includes entries to assign a responsibility for the corresponding task (e.g., VP Marketing has management responsibilities). This example embodiment, which tracks and enforces an ISO 9000 implementation, uses a grandfather to grandfather tracking scheme by tracking ISO standards through the grandfather field.

Records, which include "Corporate Policy" stored in the grandfather field, store overall corporate policies in the father field (i.e., "Management Responsibilities", "Contract Review", and "Design Control"). Similar to the "ISO Standard" tasks, a point of responsibility is assigned and indicated in the son field. Also, similar to the "ISO Standard" entries, the "Corporate Policy" entries are tracked via a grandfather to grandfather tracking scheme.

The example tracking implementation shown in FIG. 12 further includes the ability to track information of a particular client. Specifically, for this example, a number of tasks, specified in the father field, are ascribed to a particular client, the ABC client (i.e., the field identifier is "client"). The son field stores entries to indicate responsibility for the task, specified in the father column, and the ABC Client. Similar to the "ISO Standard" and "Corporate Policy" entries, the entries for the "ABC Client" are tracked through a grandfather to grandfather tracking relationship.

As shown by the example of FIG. 12, the universal tracking system permits tracking of different items in the same table (e.g., ISO standard, corporate policy, and ABC client).

Tracking and Implementing A Version Control System

The universal tracking system has further application for tracking and enforcing a version control system. A version control system has application for use in various types of development, such as software development. For example, tracking and enforcing development version control may be used in product design, architectural drawings, photo masks, circuit board layout, modeling and simulations, etc. FIG. 13 illustrates an example table for tracking and enforcing a development version control system. As shown in FIG. 13, the grandfather field has a field identifier to designate a specific project (e.g., project 1 or project 2). The father field stores a value to reflect the current version, and the son field stores a value to designate a new version. For example, the first record of FIG. 13 includes a prior version, version 0, stored in the father field, and a current version, version 1.0, stored in the son field.

One implementation to track prior-current relationships between records utilizes a son to father tracking scheme. Note that the second record of FIG. 13 includes, as a prior version in the father field, version 1.0, thereby providing the relationship between the first and second records for project 1. As shown in FIG. 13, the remaining records are tracked through the son to father relationship for both project 1 and project 2.

Tracking and Implementing A Drug Development Process

The universal tracking system has further application for use in tracking and enforcing a drug development process. FIG. 14 is an example table that illustrates tracking and enforcing a drug development process. Column one, the grandfather field, includes two types of entries: one to identify the research, and a second to identify the patient.

The example of FIG. 14 includes entries to track the project "Cancer Research #1." The cancer research entries include patient group entries, stored in the father field, and patient identification entries, stored in the son field. Accordingly, for the three "Cancer Research #1"records, the corresponding information, patient group and patient identification, are tracked through a grandfather to grandfather relationship.

Records that store the patient identification in the grandfather field (i.e., "Patient 505" and "Patient 506") store test data, from different periods of time, in the father and son fields. For example, the example table of FIG. 14 stores test results for "Patient 505" through time (e.g., history, current, and after as well as year 0, year 1, year 2, year 49 and year 50). For the grandfather entries of the patient type, tracking is accomplished through a son to father tracking scheme. The son to father tracking scheme provides an effective implementation to track objects (e.g., "test results") through time.

The example implementation of the universal tracking system shown in FIG. 14 illustrates that multiple tracking schemes may be implemented within a single table. In the drug development process example, information regarding specific cancer research projects was tracked through a grandfather to grandfather tracking scheme. In addition, test results for patients are tracked through son to father relationships for those records. Furthermore, patients, identified in the son field for a record of the cancer research type, may be tracked to patient identification in the grandfather field of the patient type records. Although this example illustrates implementing two different, but related, tracking schemes in a single table, any number of tracking schemes may be implemented, including orthogonal relationships, using the universal tracking system of the present invention.

Tracking and Implementing Land Development and Permit Processing

The universal tracking system also has application for tracking and enforcing land development and permit processing. FIG. 15a illustrates an example table that tracks information for project numbers of subdivisions. The father field identifies a project number for a particular subdivision. For the example shown in FIG. 15a, a "Project # for Subdivision A" is stored. Column 1, the grandfather field, specifies a year and a permit type. For example, the first record specifies a "Subdivision Permit" for "Year 1." In the son field, a project # (e.g., "Project #1", "Project #2", "Project #3") identifies a specific project for the corresponding subdivision, year and permit type information. For this embodiment, permit processing occurs through tracking the "Project # for Subdivision A" in the father field. Thus, this embodiment implements a father to father tracking scheme.

FIG. 15b illustrates an example table for tracking of parcel information. The first three records track parcel numbers and part identifications (e.g., parts A1, A2, A3, A4, and A5). Specifically, "parcel # part A2" entries are tracked through father to father relationships, and parcel # part A2" entries are tracked through son to son relationships. For the last five records in the table of FIG. 15b, parcel numbers and identification numbers are tracked through a father-son to father-son relationship (i.e., parcel number book-page number-parcel number track number).

FIG. 15c illustrates an example table for tracking parcel number and part identifications. For this embodiment, part identifications, for specific parcel numbers, are tracked through a father to grandfather relationship. For example, record 1, which contains identifications for parts A1, A2, and A3, forms a relationship with record 2 through the parcel number part A2 in both the father field of record 1 and the grandfather field of record 2.

Tracking Hazerdous Material Management Process

The universal tracking system has further application for use in tracking hazardous material and management processes. FIG. 16 shows an example table for implementing a hazardous material management process tracking scheme. For this embodiment, each record includes a batch number, stored in the grandfather field, as well as a source location, stored in the father field, and a destination location stored in the son field. This embodiment utilizes a son to father tracking scheme to correlate a destination location, from one record, to the same location as a source in a different record for a particular batch (e.g., identify a relationship between location 2 (destination) with location 2 (source) for batch #1).

Tracking and Implementing Transportation Management Processes

Another application for the universal tracking system is to track transportation management processes. The transportation management process example involves: tracking the route and voyages of various vessels; tracking containers and cargo for different voyages; and tracking voyages and containers for different accounts. FIG. 17 illustrates an example table for implementing a transportation management process tracking scheme. The example of FIG. 17 illustrates the use of the universal tracking system to track multiple relationships through use of a single table. First, routes and voyages are tracked through different vessels as shown in the first six records of the example table. Thus, route and voyage information for a particular vessel is tracked through a grandfather to grandfather relationship among records. In addition to voyage and route information, maintenance information for a vessel is also tracked through a grandfather to grandfather relationship of a vessel identification. For this example, service type is identified in the father column, and maintenance information is identified in the son column.

The example table of FIG. 17 further tracks connections between vessels. As shown in record 9, connection 1, identified in the father field, links vessel 2 with vessel 3. The table of FIG. 17 further correlates a specific voyage and container to a specific vessel. (See records 12 and 13). An additional relationship is identified for specific cargo within a container and voyage. For this implementation, the relationship is generated through a father-son to grandfather-father relationship. (See records 13 and 14). The table of FIG. 17 contains further information about voyage and containers for specific accounts. Records 15 and 16 show account identification, stored in the grandfather field, as well as voyage and container identification stored in the father and son fields, respectively. The voyage/container identification may be tracked through voyage/container information for specific vessels through a father-son to father-son relationship. (See records 12 and 15). As illustrated by the example of FIG. 17, a tracking scheme for a complex transportation management system may be implemented using the flexibility provided by the universal tracking system.

Tracking A Model of The Universe

A tracking scheme, implemented through the universal tracking system, that tracks multiple relationships is further illustrated through tracking spatial relationships. Generally, objects, which have historical relationships, may be tracked through grandfather, father and son fields to emulate the historical relationships (i.e., the son is historically related to the father, etc.). FIG. 18 illustrates an example table that tracks spatial relationships of the universe. A big bang, identified in the grandfather field, generates a galaxy cluster, identified in the father field. In turn, a galaxy, identified in the son field, is a part of the galaxy cluster identified in the father field. Similarly, broader objects to more specific objects are tracked in each of the records of the table shown in FIG. 18. For example, in records 2 and 3, a planet, identified in the son field, is a part of a solar system, identified in the father field. In turn, the solar system of the father field is a part of the galaxy identified in the grandfather field. Records 2 and 3 may be tracked through a grandfather-father to grandfather-father relationship.

For the example shown in FIG. 18, objects, which are a part of an object in the grandfather or father field, are tracked in records 4, 5, 6, 7 and 8. Specifically, a son to grandfather tracking scheme is implemented to provide a relationship among records. For example, record 4, which depicts the "is a part of" relationships among Earth, North America, and USA, is associated with record 5, which shows the relationship among the U.S.A., the state of California, and a silicon mine #1.

The universal tracking system is also ideal for tracking objects that have a temporal or time related relationship. FIG. 19 illustrates an example table that tracks time. The first three records of the table exhibit father-son to father-grandfather relationships. Similar to FIG. 18, the object identified in the son field is a part of the object identified in the grandfather field for the first three records. However, in the father field, a time stamp, correlating the object relationship with time, is identified. A similar relationship exists for records 6 and 7. For these records, time is tracked through a father to father relationship. The time, identified in the father field, is related to the condition, identified in the son field, of the central processing unit (CPU), identified in the grandfather field.

Relational Sequence Generator

As discussed above in conjunction with FIG. 1, sequence generators are functions that generate a sequence of unique identifiers. These unique sequence numbers are typically used as an identifier or a primary key for database tables. The universal tracking system further includes sequence generators, called relational sequence generators, that generate relational sequence numbers. In general, relational sequence generators are special functions that generate a sequence of unique identifiers while maintaining a relationship among records in accordance with pre-defined relationships or tracking schemes. Relational sequence generators have application to generate numbers for use in systems where each column of numbers, by themselves, are not unique, but the number as a combination of all three columns is a unique number (i.e., the combination of numbers in the grandfather, father and son fields as a set is unique).

FIG. 20a illustrates an example table that uses a relational sequence number generator for a son to grandfather tracking scheme. As shown in FIG. 20a, records are tracked through a son to grandfather relationship (e.g., 30000 for records 1 and 2, and 50000 between records 2 and 3). For record 1, the relational sequence generator creates the number "10000" and "20000", and "30000" in the grandfather, father, and son fields, respectively. To relate record 1 with record 2, the relational sequence number generator generates the numbers "30000", "40000", and "50000" for the grandfather, father, and son fields, respectively. Thus, the relational sequence number generator generates a sequence of numbers for each number that maintains tracking through a particular tracking scheme (e.g., a son to grandfather tracking scheme for the embodiment of FIG. 20a).

FIG. 20b illustrates another scheme for creating relational sequence numbers. Similar to the example of FIG. 20a, the relational sequence generator generates numbers in accordance with a son to grandfather tracking scheme. For the example shown in FIG. 20b, the relational sequence number generator starts with "10001", and increments this number for each new number in the sequence. To maintain the tracking relationship, the number "10003" is generated for both the son field of record 1 and the grandfather field of record 2.

FIG. 21 illustrates an example table created by a relational sequence generator that implements a father to father tracking scheme. As shown in FIG. 21, an initial seed number, "10000", is generated in the father field for each record, thereby providing a relationship among the records. A sequence is generated for values stored in the grandfather and son fields (e.g., 10001, 10002, 10003, etc.).

FIG. 22 illustrates an example table created by a relational sequence generator that implements a son to father tracking scheme. For this example, the sequence begins with the number "10001" as the value stored in the grandfather field of record 1. The next number in the sequence is generated for subsequent values in the father and son fields of record 1. Record 2 includes the value "10003", stored in the father field, to thereby provide a relationship to record 1. Values for the grandfather and son fields of record 2 are generated in accordance with the sequence (i.e., 10004 and 10005, respectively).

Although the examples set forth in FIGS. 20–22 illustrate a relational sequence number generator that generates numbers that are numerically sequential (e.g., 10001, 10002, 10003, etc.), any sequence of numbers, or alphanumeric values, may be generated without deviating from the spirit and scope of the invention.

Figure 23:
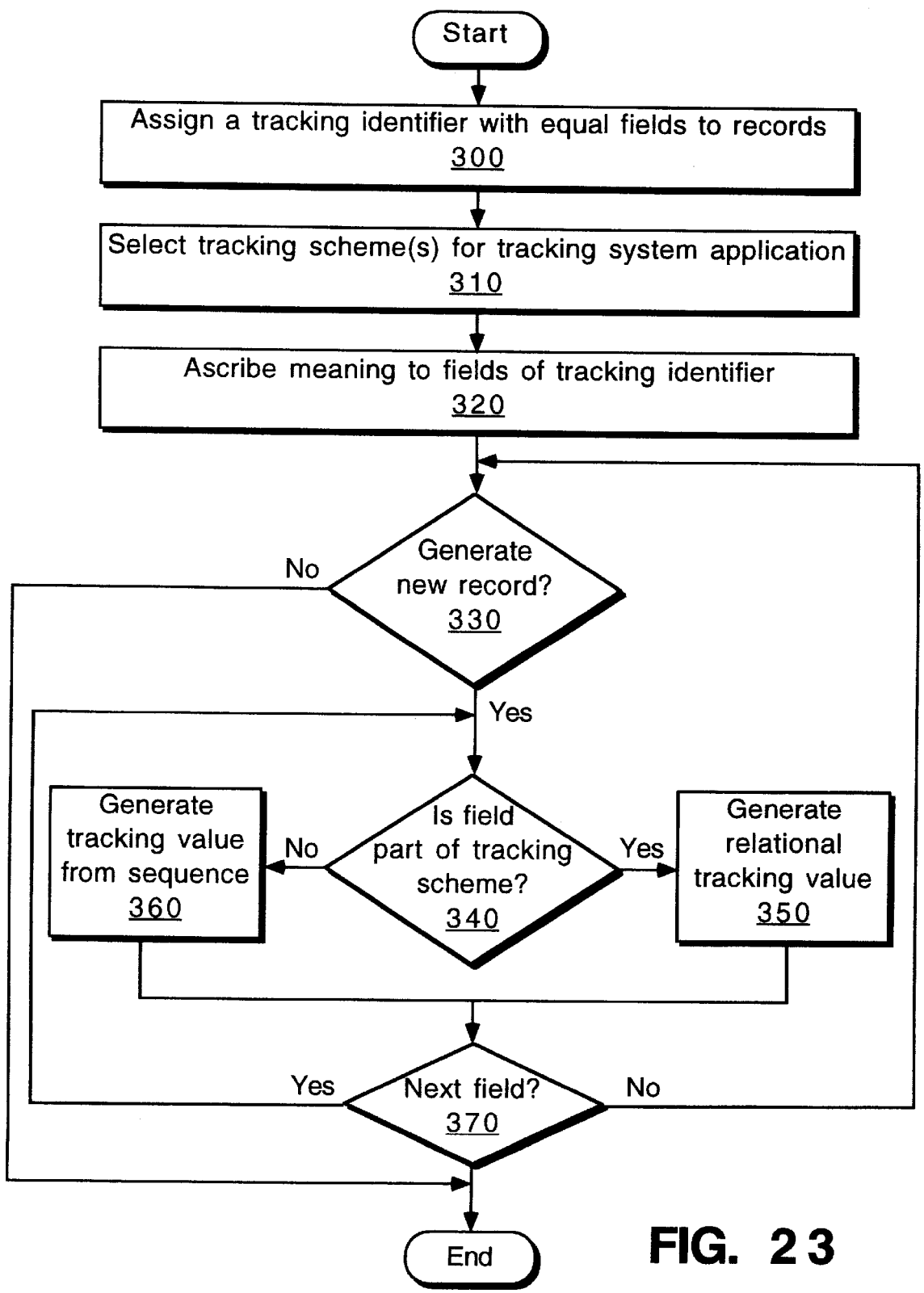
FIG. 23 is a flow diagram illustrating one embodiment for set-up and use of the universal tracking system.

FIG. 23 is a flow diagram illustrating one embodiment for set-up and use of the universal tracking system. The steps, labeled in blocks 300, 310, and 320, are directed towards set-up or implementation of the universal tracking system for a particular tracking application. As shown in block 300, a tracking identifier, with equal length fields, is assigned to records in a database. As discussed above, assigning tracking identifiers with three equal fields accommodate any tracking application. Depending upon the particular tracking application, one or more tracking schemes are selected as shown in block 310. As discussed above, multiple tracking schemes may be implemented in a single database or set of records. As illustrated in the above tracking applications, the particular tracking scheme selected is dependent upon the tracking application. As shown in block 320, a meaning or definition is ascribed to the fields of the tracking identifier. Again, the assignment of field identifiers to fields of a tracking identifier is dependent upon the particular tracking application. Examples for specifying field identifiers are set forth in examples of FIGS. 12–19.

In the flow diagram of FIG. 23, blocks 330, 340, 350, 360, and 370 set forth one embodiment for use of the universal tracking system. Decision block 330 illustrates the beginning of record generation for a tracking application. For a field of the tracking identifier, (e.g., the grandfather field), a determination is made as to whether the field is part of the tracking scheme as shown in block 340. For example, if the tracking scheme used for the particular record is a grandfather-grandfather tracking scheme, and the field is a grandfather field, then the field is used as part of the tracking scheme. If the field is part of the tracking scheme, then a "relational" tracking value is generated to relate the field to the prior record being tracked as shown in block 350. For example, in the grandfather-grandfather tracking scheme, a tracking value, equivalent to the tracking value stored in the grandfather position of the record being tracked, is generated. Alternatively, if the field is not part of the tracking scheme, then a new tracking value is generated for the field as shown in block 360. In one embodiment, and as described above, the tracking value is a unique tracking value generated from a sequence in the relational sequence generator. As shown in block 370, if the record contains an additional field, then step 340 is executed for the new field. Alternatively, if a tracking value has been generated for the last field (e.g., the son field), then a new record may be processed.

Computer System

Figure 24:
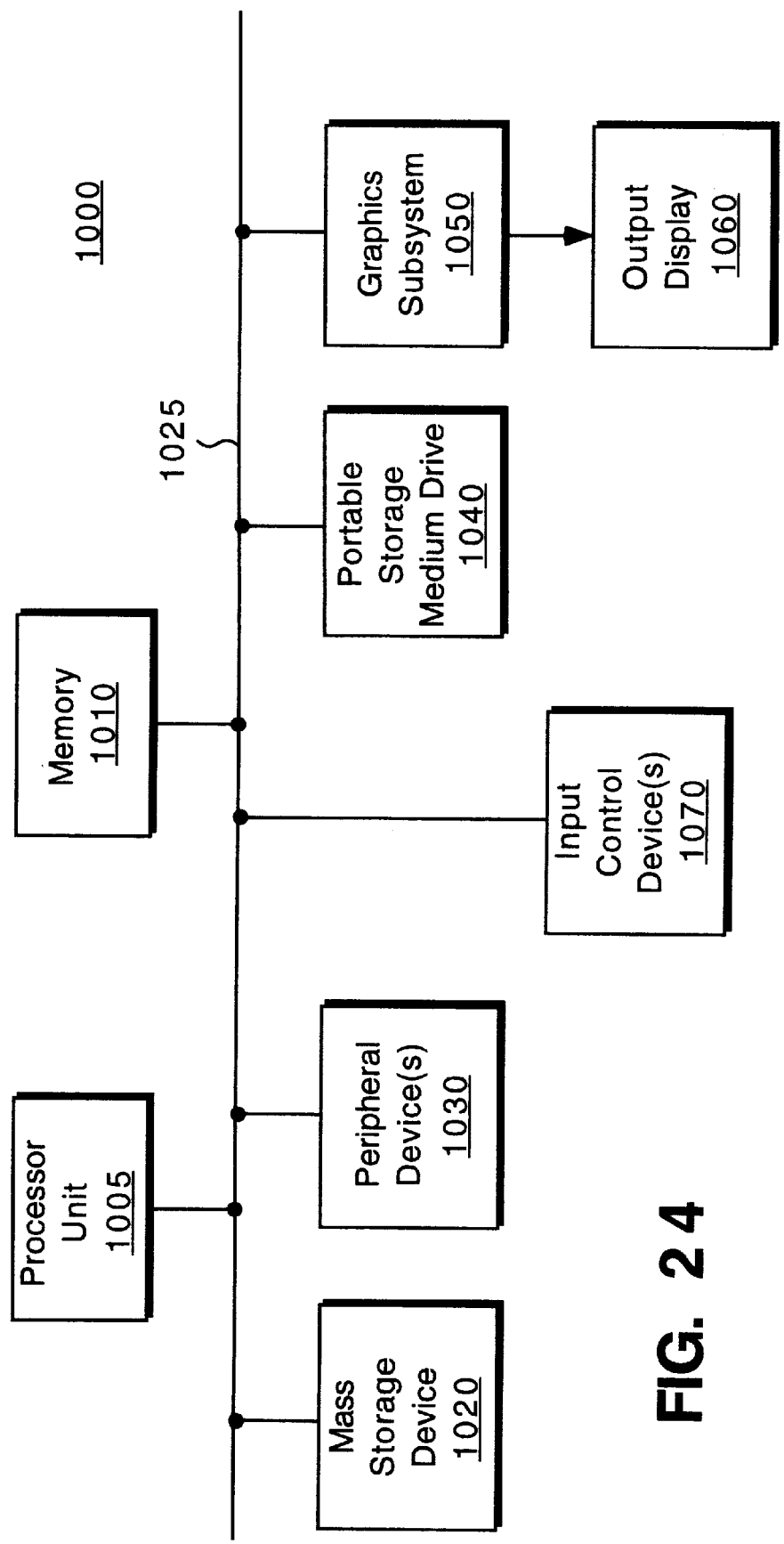
FIG. 24 illustrates a high level block diagram of a general purpose computer system in which the universal tracking system of the present invention may be implemented.

FIG. 24 illustrates a high level block diagram of a general purpose computer system in which the universal tracking system of the present invention may be implemented. A computer system 1000 contains a processor unit 1005, main memory 1010, and an interconnect bus 1025. The processor unit 1005 may contain a single microprocessor, or may contain a plurality of microprocessors for configuring the computer system 1000 as a multi-processor system. The main memory 1010 stores, in part, instructions and data for execution by the processor unit 1005. If the universal tracking system of the present invention is wholly or partially implemented in software, the main memory 1010 stores the executable code when in operation. The main memory 1010 may include banks of dynamic random access memory (DRAM) as well as high speed cache memory.

The computer system 1000 fuirther includes a mass storage device 1020, peripheral device(s) 1030, portable storage medium drive(s) 1040, input control device(s) 1070, a graphics subsystem 1050, and an output display 1060. For purposes of simplicity, all components in the computer system 1000 are shown in FIG. 24 as being connected via the bus 1025. However, the computer system 1000 may be connected through one or more data transport means. For example, the processor unit 1005 and the main memory 1010 may be connected via a local microprocessor bus, and the mass storage device 1020, peripheral device(s) 1030, portable storage medium drive(s) 1040, graphics subsystem 1050 may be connected via one or more input/output (I/O) busses. The mass storage device 1020, which may be implemented with a magnetic disk drive or an optical disk drive, is a non-volatile storage device for storing data and instructions for use by the processor unit 1005. In the software embodiment, the mass storage device 1020 stores the universal tracking system software for loading to the main memory 1010.

The portable storage medium drive 1040 operates in conjunction with a portable non-volatile storage medium, such as a floppy disk or a compact disc read only memory (CD-ROM), to input and output data and code to and from the computer system 1000. In one embodiment, the universal tracking system software is stored on such a portable medium, and is input to the computer system 1000 via the portable storage medium drive 1040. The peripheral device (s) 1030 may include any type of computer support device, such as an input/output (I/O) interface, to add additional functionality to the computer system 1000. For example, the peripheral device(s) 1030 may include a network interface card for interfacing the computer system 1000 to a network.

The input control device(s) 1070 provide a portion of the user interface for a user of the computer system 1000. The input control device(s) 1070 may include an alphanumeric keypad for inputting alphanumeric and other key information, a cursor control device, such as a mouse, a trackball, stylus, or cursor direction keys. In order to display textual and graphical information, the computer system 1000 contains the graphics subsystem 1050 and the output display 1060. The output display 1060 may include a cathode ray tube (CRT) display or liquid crystal display (LCD). The graphics subsystem 1050 receives textual and graphical information, and processes the information for output to the output display 1060. The components contained in the computer system 1000 are those typically found in general purpose computer systems, and in fact, these components are intended to represent a broad category of such computer components that are well known in the art.

The universal tracking system may be implemented in either hardware or software. For the software implementation, the universal tracking system is software that includes a plurality of computer executable instructions for implementation on a general purpose computer system. Prior to loading into a general purpose computer system, the universal tracking system software may reside as encoded information on a computer readable medium, such as a magnetic floppy disk, magnetic tape, and compact disc read only memory (CD-ROM). In one hardware implementation, the universal tracking system may comprise a dedicated processor including processor instructions for performing the functions described herein. Circuits may also be developed to perform the functions described herein.

Although the present invention has been described in terms of specific exemplary embodiments, it will be appreciated that various modifications and alterations might be made by those skilled in the art without departing from the spirit and scope of the invention.

What is claimed is:

1. A method for tracking records in a relational database of a computer system, said method comprising the steps of:

assigning tracking identifiers to records of a table in a relational database, wherein a tracking identifier comprises a plurality of fields of equal length in a corresponding record; and generating tracking values for storage in said tracking identifiers of said records, to track relationships between at least two records, that associate one or more fields of a tracking identifier of a first record with one or more fields of a tracking identifier of another record associated with said first record.

2. The method as set forth in claim 1, further comprising the step of assigning field identifiers to define a meaning for a field of a tracking identifier, such that a field identifier of one field defines an object that is a part of an object defined by one or more other field identifiers in said tracking identifier.

3. The method as set forth in claim 1, further comprising the steps of assigning field identifiers to define a meaning for a field of a tracking identifier, such that a field identifier of one field defines an event temporally related to an event defined by one or more other field identifiers in said tracking identifier.

4. The method as set forth in claim 1, further comprising the step of generating additional tracking values for said tracking identifiers, to track relationships between at least two additional records, that associates one or more fields of a tracking identifier of a record with one or more fields of a tracking identifier of another record associated with said record.

5. The method as set forth in claim 1, wherein the step of storing tracking values for a record in a plurality of equal length fields comprises the step of storing tracking values for a record in three equal length fields.

6. The method as set forth in claim 1, wherein the step of storing tracking values for a record in a plurality of equal length fields comprises the step of storing tracking values that comprise five digits per field.

7. The method as set forth in claim 1, wherein the step of generating tracking values for said tracking identifiers comprises the step of storing equivalent tracking values in a predetermined one of said fields for each record being tracked.

8. The method as set forth in claim 1, wherein the step of generating tracking values for said tracking identifiers comprises the steps of:

storing an equivalent tracking value in one field of said fields; and storing said equivalent tracking value in a different field of a different record being tracked.

9. The method as set forth in claim 1, wherein the step of generating tracking values for records comprises the steps of:

generating a first tracking value in one field of a first record;

generating a second tracking value in a different field of said first record;

generating said first tracking value in one field of a record being tracked to said first record; and generating said second tracking value in a different field of a record being tracked to said first record.

10. The method as set forth in claim 1, further comprising the steps of:

assigning field identifiers to define a meaning for fields of a tracking identifier for a first record;

assigning field identifiers to define a meaning for fields of a tracking identifier for a second record such that said field identifiers in said second record are extension of said field identifiers of said first record; and generating tracking values for said tracking identifiers to associate said first record and said second record.

11. A method for universally tracking records in a computer system, said method comprising the steps of:

assigning tracking identifiers to records of a table in a relational database, wherein a tracking identifier comprises a plurality of fields of equal length in a corresponding record; and implementing a tracking scheme to generate an association between at least two records in said database, wherein said tracking scheme associates said at least two records through one or more fields of a tracking identifier of a first record and one or more fields of a tracking identifier of another record associated with said first record.

12. The method as set forth in claim 11, further comprising the step of generating tracking values for tracking identifiers to track selected records in accordance with said tracking scheme.

13. A method for generating relational sequence identifiers for records in a relational database, said method comprising the step of:

defining a sequence of unique identifiers;

assigning tracking identifiers to records of a table in a relational database, wherein a tracking identifier comprises a plurality of fields of equal length in a corresponding record;

selecting at least one tracking scheme to track records, wherein said tracking scheme associates at least two records through one or more tracking fields of a tracking identifier of a first record and one or more tracking fields of a tracking identifier of another record associated with said first record;

assigning, for a value of a field, the next identifier in said sequence of unique identifiers if said field is not a tracking field used in said tracking scheme to associate records; and assigning, for a value of a field, an identifier previously assigned to track a record being tracked.

14. A computer readable medium comprising a set of instructions stored therein, which when executed by a computer, causes the computer to perform the steps of:

assigning tracking identifiers to records of a table in a relational database, wherein a tracking identifier comprises a plurality of fields of equal length in a corresponding record; and generating tracking values for storage in said tracking identifiers of said records, to track relationships between at least two records, that associate one or more fields of a tracking identifier of a first record with one or more fields of a tracking identifier of another record associated with said first record.

15. The computer readable medium as set forth in claim 14, further comprising the step of assigning field identifiers to define a meaning for a field of a tracking identifier, such that a field identifier of one field defines an object that is a part of an object defined by one or more other field identifiers in said tracking identifier.

16. The computer readable medium as set forth in claim 14, further comprising the steps of assigning field identifiers to define a meaning for a field of a tracking identifier, such that a field identifier of one field defines an event temporally related to an event defined by one or more other field identifiers in said tracking identifier.

17. The computer readable medium as set forth in claim 14, further comprising the step of generating additional tracking values for said tracking identifiers, to track relationships between at least two additional records, that associates one or more fields of a tracking identifier of a record with one or more fields of a tracking identifier of another record associated with said record.

18. The computer readable medium as set forth in claim 14, wherein the step of storing tracking values for a record in a plurality of equal length fields comprises the step of storing tracking values for a record in three equal length fields.

19. The computer readable medium as set forth in claim 14, wherein the step of storing tracking values for a record in a plurality of equal length fields comprises the step of storing tracking values that comprise five digits per field.

20. The computer readable medium as set forth in claim 14, wherein the step of generating tracking values for said tracking identifiers comprises the step of storing equivalent tracking values in a predetermined one of said fields for each record being tracked.

21. The computer readable medium as set forth in claim 14, wherein the step of generating tracking values for said tracking identifiers comprises the steps of:

storing an equivalent tracking value in one field of said fields; and storing said equivalent tracking value in a different field of a different record being tracked.

22. The computer readable medium as set forth in claim 14, wherein the step of generating tracking values for records comprises the steps of:

generating a first tracking value in one field of a first record;

generating a second tracking value in a different field of said first record;

generating said first tracking value in one field of a record being tracked to said first record; and generating said second tracking value in a different field of a record being tracked to said first record.

23. The computer readable medium as set forth in claim 14, further comprising the steps of:

assigning field identifiers to define a meaning for fields of a tracking identifier for a first record;

assigning field identifiers to define a meaning for fields of a tracking identifier for a second record such that said field identifiers in said second record are extension of said field identifiers of said first record; and generating tracking values for said tracking identifiers to associate said first record and said second record.

24. A computer readable medium comprising a set of instructions stored therein, which when executed by a computer, causes the computer to perform the steps of:

defining a sequence of unique identifiers;

assigning tracking identifiers to records of a table in a relational database, wherein a tracking identifier comprises a plurality of fields of equal length in a corresponding record;

selecting at least one tracking scheme to track records, wherein said tracking scheme associates at least two records through one or more tracking fields of a tracking identifier of a first record and one or more tracking fields of a tracking identifier of another record associated with said first record;

assigning, for a value of a field, the next identifier in said sequence of unique identifiers if said field is not a tracking field used in said tracking scheme to associate records; and assigning, for a value of a field, an identifier previously assigned to track a record being tracked.

25. A computer system comprising:

a database comprising a plurality of records, said records including a tracking identifier, to track records of a table in a relational database, that comprise a plurality of fields of equal length in a corresponding record; and processor unit, coupled to said database, for generating tracking values for storage in said tracking identifiers, to track relationships between at least two records, that associate one or more fields of a tracking identifier of a first record with one or more fields of a tracking identifier of another record associated with said first record.

26. A method for tracking records in a computer system, said method comprising the steps of:

assigning tracking identifiers for records, of a table wherein a tracking identifier for a record comprises a plurality of digits, such that a first subset number of digits are utilized to track records and a second subset number of digits are utilized to uniquely identify a record;

generating equivalent tracking values for said first subset number of said digits in said tracking identifiers of at least two records to track relationships between those two records, so as to associate a subset of digits of a value of a first record with a subset of digits of a value of another record being tracked with said first record; and generating a unique value for said second subset number of digits to uniquely identify said record.

27. The method as set forth in claim 26, wherein:

the step of assigning a value to records comprises the step of partitioning values of records into a plurality of equal length fields; and the step of generating equivalent tracking values for tracking identifiers comprises the step of generating equivalent tracking values for less than three fields to associate said first record with another record being tracked with said first record.

\* \* \* \* \*